United States Patent
Sherwood

(10) Patent No.: US 7,004,309 B2
(45) Date of Patent: Feb. 28, 2006

(54) VACUUM BELT CONVEYOR SYSTEM

(76) Inventor: Bernard J. Sherwood, 8310 Con Road #2, Lisle, On. (CA) L0M 1M0

( * ) Notice: Subject to any disclaimer, the term of this patent is extended or adjusted under 35 U.S.C. 154(b) by 0 days.

(21) Appl. No.: 10/898,932

(22) Filed: Jul. 27, 2004

(65) Prior Publication Data

US 2006/0021858 A1  Feb. 2, 2006

(51) Int. Cl.
*B65G 23/44* (2006.01)

(52) U.S. Cl. .................. 198/813; 198/835; 198/689.1
(58) Field of Classification Search ............... 198/834, 198/835, 813, 689.1
See application file for complete search history.

(56) References Cited

U.S. PATENT DOCUMENTS

| | | | |
|---|---|---|---|
| 3,580,450 A | * | 5/1971 | Sparks .................. 198/835 |
| 5,156,260 A | * | 10/1992 | Dorner et al. ............ 198/813 |
| 5,361,891 A | * | 11/1994 | Greene et al. ............ 198/834 |
| 5,415,273 A | * | 5/1995 | Peterson ................. 198/835 |
| 5,871,085 A | * | 2/1999 | Yagi ..................... 198/835 |
| 6,578,705 B1 | * | 6/2003 | Lunghi ................... 198/835 |

* cited by examiner

Primary Examiner—James R. Bidwell

(57) ABSTRACT

A vacuum conveyor has a toothed belt with opposed sets of teeth along the sides of the belt inner surface; the belt is driven by a synchronous motor giving very precise delivery, the motor driving a toothed roll located in the conveyor center section within the loop of the belt. The oncoming and offgoing belt guidance rolls have replaceable bearing inserts; two rolls control the wrap and load transfer between the belt and the driving roll; the top reach of the perforated belt slides on plastic vacuum blocks, having through air passages in corresponding patterned relation at the surfaces of the blocks, bounded by air-sealing shoulder portions of the blocks.

6 Claims, 8 Drawing Sheets

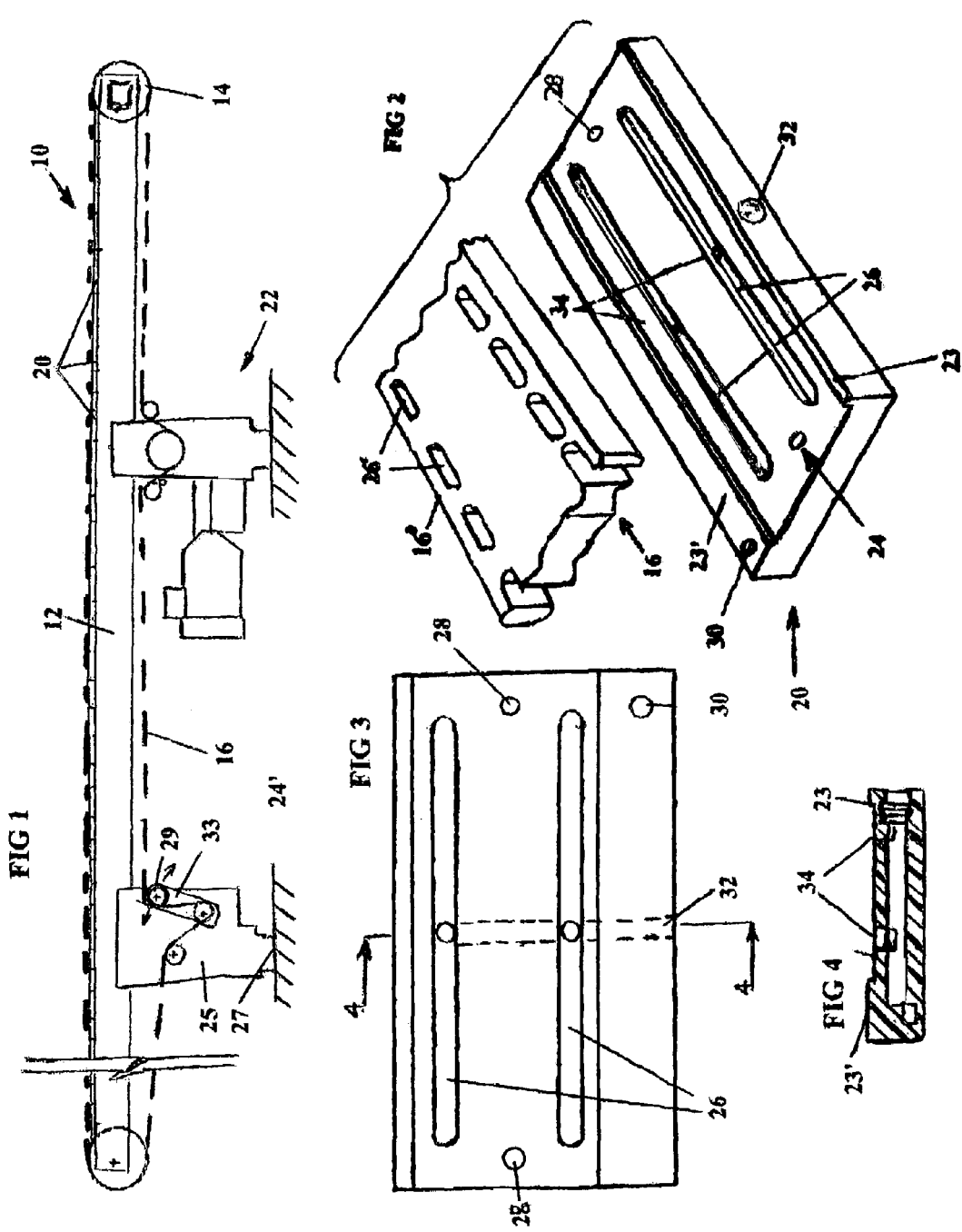

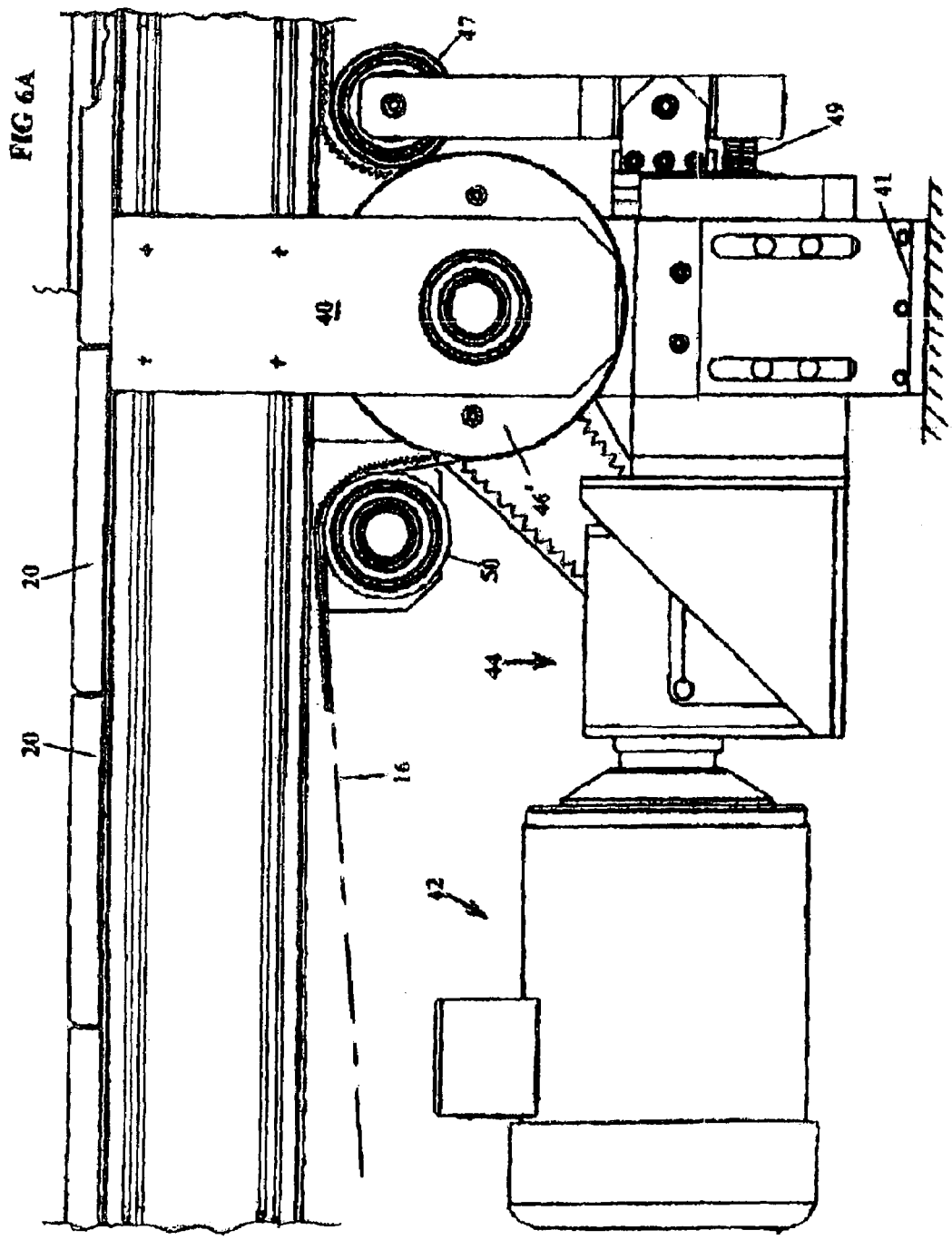

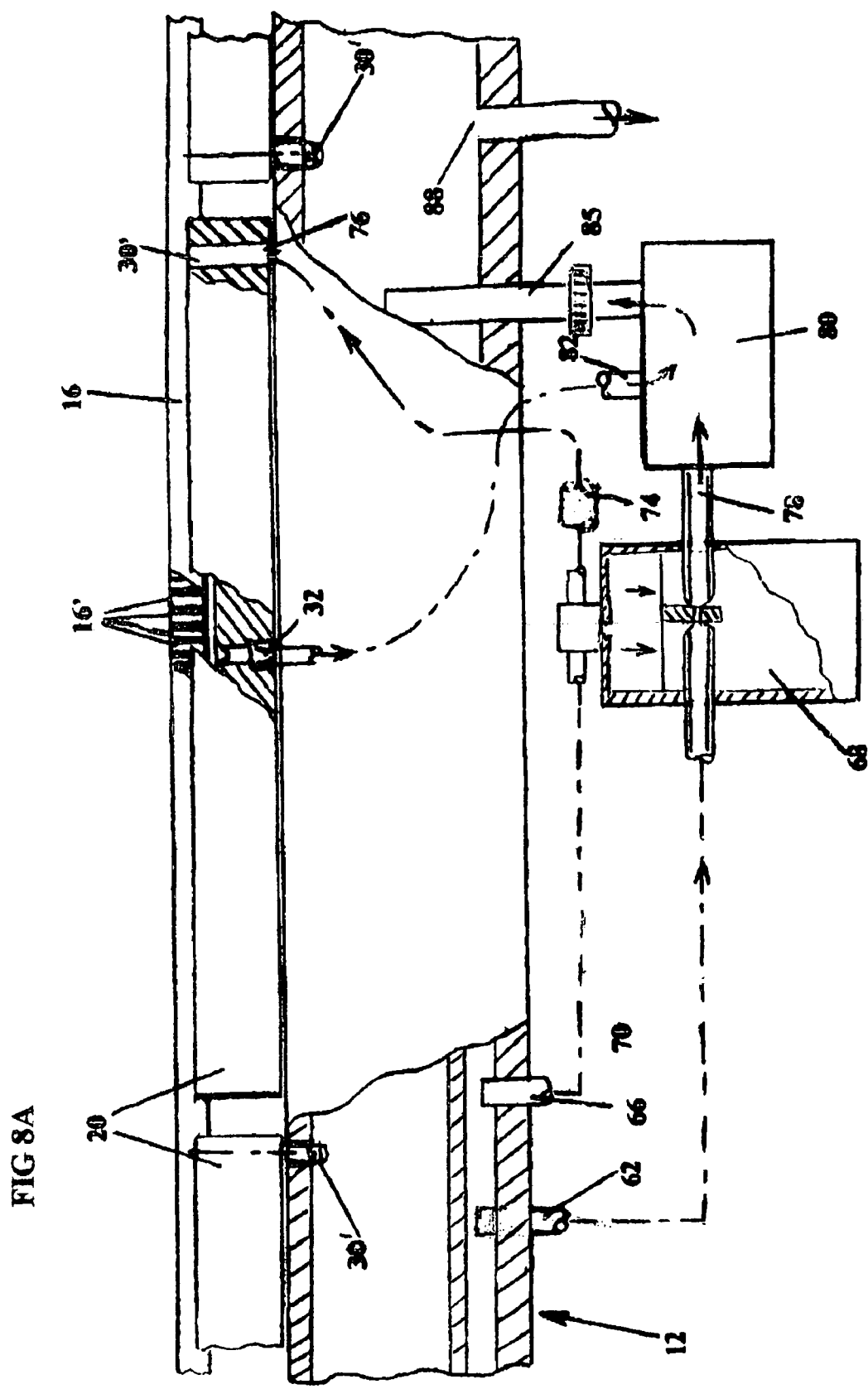

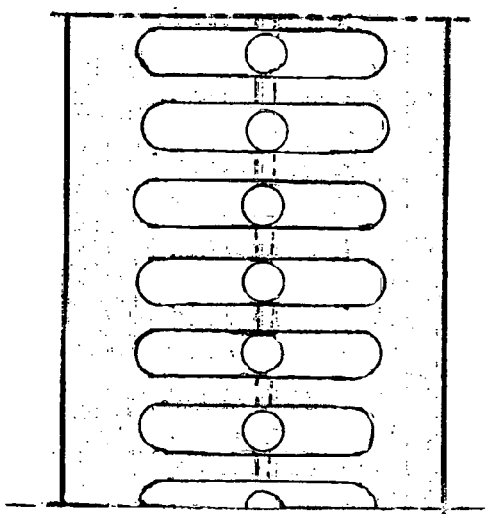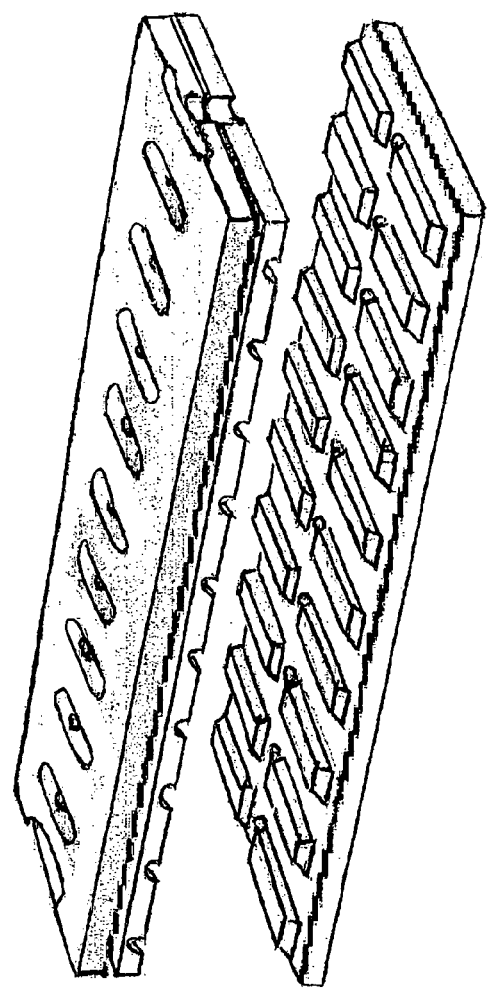

VACUUM BELT CONVEYOR SYSTEM

CROSS-REFERENCE TO RELATED APPLICATIONS

N.A. (Not Applicable).

STATEMENT REGARDING FEDERALLY SPONSORED RESEARCH OR DEVELOPMENT

N.A.

REFERENCE TO A SEQUENCE LISTING, A TABLE, OR A COMPUTER PROGRAM LISTING

N.A.

COMPACT DISC APPENDIX

N.A.

BACKGROUND OF THE INVENTION

1. This invention is directed to a belt conveyor system, and in particular to an improved conveyor system incorporating a vacuum belt for effecting the pneumatic transfer of articles.

2. Belt conveyors for transferring articles are widely used in industry, including incorporation as integral parts of production lines, for a wide range of products. Such production lines frequently have work stations at spaced intervals, at which the conveyor is required to stop, to enable working upon the conveyed article. In such instances the precise monitoring of the displacement of the conveyor belt along its path and the lateral, horizontal positioning of the conveyed articles becomes very important. Prior systems, which monitor travel of the conveyor belt for such location purposes by encoding the revolutions of the driving motor, and which drive from an end roller, suffer from inaccuracy, due to belt slippage which generates discrepancies between rotation of the driving motor and the actual travel of the belt.

Inconsistencies in belt tension, with consequent variations in the rates of belt slippage, exacerbate this problem.

Certain types of article, for example lightweight articles having relatively large surface areas, such as plastic sheets, sheets of thin metal, cardboards, including cardboard blanks and blocks generally have smooth, low friction surfaces that make their transfer and handling most difficult. In some instances, such problems are accentuated, due to the relative fragility of the articles, or other factors such as a susceptibility to becoming marked on their surfaces, as a consequence of transfer to or passage along a conveyor, including encounter with hard stops and position sensing mechanical feelers.

The use of pneumatic transfer with conveyor systems is well known, and widely practiced, both in regard to belt conveyors and for agricultural purposes, such as the blowing of grain along pipes.

In the case of belt conveyors with pneumatic transfer many existing systems are characterized by their use of wide-area suction chambers, with associated unduly large air-mass displacement requirements, in the form of generated vacuum, or of compressed air. The response times of such systems is unduly slow, while the necessary air displacement is large, and excessive forces may be generated against system components, including the associated friction drag upon the belt, with consequent increased wear.

In other systems, the large size of certain vacuum system components necessitates unduly large belt turning radii, with correspondingly large end pulleys and related space requirements.

It should be noted that the size of a conveyor system per se, both in height and width, can bear significant economic implications, with down-sizing being most desireable. This has particular bearing on the size and location of the necessary anciliary systems associated with the conveyor.

The driving systems for conveyors usually employ a chain or other transmission acting upon the end roller of the conveyor, usually at the oncoming end. Certain disadvantages associated with these earlier arrangements include unsatisfactory frictional tractive effort between the pulley and the belt, due to the limited (180 degree or less) wrap of the belt on the pulley, and shortage of space at the conveyor end, where the motor and reduction gear are located. Also, this type of system limits and complicates the belt tensioning arrangements, as tractive transfer at the pulley is dependent upon the extent of belt wrap about the pulley, and upon belt tension.

Inadequate belt tensioning also results in excessive lost motion when the drive is reversed in order to reverse the conveyor. This exacerbates the problems encountered in achieving accurate registry of the conveyor with the associated workstations to which delivery is being made.

The handling of ferritic sheet-metal production lines has involved magnetic conveyors, which employ magnets to secure the sheet to the conveyor. There is a requirement to handle sheets of different thickness, and to permit precise manipulation of them for purposes such as the welding together of two adjoining sheets of different thickness, to form welded blanks for automotive stampings, for which operations the characteristics of magnetic attachment are not well suited.

Magnetic conveyors are also ineffective for handling aluminum or stainless steel sheet, plastic, glass, paper and cardboard, etc.

My earlier system, as disclosed in my U.S. Pat. No. 6,141,565 of Nov. 19, 2002, while overcoming many of the above-listed defects of the prior art, has been significantly improved upon, by way of the changes as set forth below.

SUMMARY OF THE INVENTION

The present invention provides a modular pneumatic belt transfer system for conveyors, the conveyor system consisting of a plurality of individual vacuum blocks, over which a perforated conveyor belt runs.

The overall layout of the subject conveyor is similar to that of my earlier sytem, as disclosed in my above-identified U.S. patent.

In my present, improved system the vacuum blocks are moulded in high density polyethylene plastic, to provide a significantly improved low friction, light weight, low cost belt support surface.

As in my earlier patent (above), the aligned vacuum blocks occupy the top of a hollow beam that extends the length of the conveyor, the interior of which provides both high and low pressure air passage ways and vacuum exhaust return passages to receive, contain and dispose of contaminants sucked from the material being transported. However, an improved beam section with larger air passages has been adopted, which has enabled the adoption of a significantly simplified system.

The subject modular system incorporates a vacuum block for operation with a belt conveyor, the system incorporating a non-wearing, air driven, reaction sensing means to determine the presence of an article upon the conveyor above the block; air-driven vacuum generation means; and a pneumatic control actuated by the sensing means to operate the vacuum generation means, to apply vacuum by way of the suction block, to that section only, through the perforated belt to the over-lying section of the conveyor, in response to the sensed presence of an object upon that section of the conveyor.

My patented prior embodiment, has air regulators incorporated into the supply circuit of the reaction sensing means.

In the present invention, use of a different beam section, with significantly larger auxiliary passages forming part of the beam section, provides improved high pressure and low pressure air service for the transfer system. This enhanced system air flow and capacity characteristic, enables the above-mentioned regulators to be dispensed with The vacuum blocks of the present invention have a modified top profile, used with a positive drive, toothed transfer belt; and molded plastic blocks that provide significant cost and performance benefits over the teflon-coated metal blocks of my patent (above). The vacuum generation means consists of a multi-stage air-driven venturi, having a high pressure air jet or jets discharging through convergent-divergent nozzles, serving as an air ejector, when energised by the triggering of an object-sensing jet, to thereby provide a source of high volume air flow, generating a correspondingly rapid rate of air exhaustion building to a high vacuum, which is applied to the vacuum block of the module.

In one embodiment, each module may have its respective vacuum generator. However, it will be understood that a larger capacity vacuum generator may be used to service a plurality or batch of modules, the respective object-sensing sensor of each module being used to selectively apply the batch vacuum to the active module.

The object-sensing means consists of low pressure air jet means having an escape flow path immediately adjacent an edge of the conveyor belt. The partial blocking of that flow path by the presence of an overlying object causes a build-up in back-pressure in the air supply circuit of the sensor, sufficient to actuate an air servo-valve, thereby admitting supply air to the air displacement (vacuum generation) means. This causes rapid displacement of air from the vacuum block, and applies suction to the block, which suction is transferred through the perforated belt to the overlying object, causing it to be drawn down to the belt, for transfer and delivery by the belt.

In the preferred system embodiment the subject vacuum blocks each comprise part of an individual module, each module being essentially self contained, with its own object-sensing means and associated air displacement unit. This gives huge savings in air consumption, as only the needed modules are turned on. This enables the provision of exceedingly compact, self-contained system elements, while their modular nature enables the provision of conveyors of virtually any desired length.

The vacuum blocks are selectively located to provide a desired object-sensing and air displacement pattern in conjunction with the adjoining, superposed perforated conveyor belt.

In some embodiments the low pressure sensing jet is incorporated with the vacuum block. However it will be understood that this is not imperatively the case, as the sensor may be physically located independently of the vacuum block.

The vacuum blocks are of generally small size, in the case of my earlier apparatus disclosed in my patent being made of hardened, Teflon (T.M.) coated aluminum, and being further characterized by having a shallow top groove for passage of a conveyor belt therealong. The belt fits closely in the groove, the groove sides serving to guide the belt in its passage along the beam, and to complement the sealing of the belt to the block with substantially no increase in wear or drag upon the belt or the block.

My vacuum blocks are now of moulded high density polyethylene which results in cost savings and significantly reduced friction between the belt and the blocks, with a consequent reduction in the power required to drive the belt. Also, machining of the blocks is less costly.

In the present invention use is made of a positive-drive belt incorporating teeth, akin to existing practice for automotive timing belts, the conveyor belt having two tooth sets located on the undersides of the outer edges of the belt, with a central band portion of reduced depth (without teeth) located therebetween. This central band portion is perforated, connecting with a series of lateral grooves, located on the outer face of the belt, by which vacuum is applied. The inner surface of the central band portion of the belt provides a central bearing surface on which the belt rides.

The central portion of each vacuum block is raised, to support the band central portion of the belt in sliding relation thereon. The sides of the vacuum blocks have upstanding shoulder portions, the inner edge faces of which form an effective air seal with the adjacent outer edges of the belt, to maintain vacuum at the central belt/block interface. Inboard of the vacuum block side shoulders, the top of the block is recessed to accommodate the passage of the toothed drive portions of the belt, the surfaces of which do not normally contact the block.

The system low pressure sensing jets are located in a shoulder portion of the block, outboard of the belt toothed portions.

In most instances of use of the present system, the articles being conveyed overhang the sides of the narrow conveyor belt, so that the sensing jets are readily activated by the presence of the overhanging articles.

The conveyor has a series of the subject vacuum blocks mounted in mutual, substantially end-to-end relation upon the hollow beam, which extends the length of the conveyor, with respective segment portions of the beam interior serving as air passages for the conveyor air system.

In operation, a respective suction block only comes into operation when the belt portion passing over that block is carrying something that obstructs the sensor so as to actuate the air servo, thus energizing the air transfer means, which in this case operate as vacuum generation means, thereby applying suction to the affected block.

The surface of the suction block of one embodiment has discrete, longitudinally extending air-way grooves positioned laterally directly below the longitudinal axes along which the vertical apertures of the belt are located. This directs the suction applied to the block directly to the belt apertures, and thus minimizes the suction force acting upon the belt, per se; while also minimizing the interior air space, and the associated mass air displacement required to effect vacuum at the belt upper surface.

The block module thus provides an extremely rapid suction response to operation of the object-sensor, with correspondingly rapid operation of the air transfer means.

Accordingly, it will be appreciated that the reaction forces generated between the belt and the vacuum block consist normally of only the load applied by the belt and its superimposed load; and that the addition of suction forces acting upon the belt occurs only when the sensor of a selected block is activated by the presence of a superimposed load object upon the belt, whereby the respective individual block system is energized, and suction is applied to the block, causing draw-down to the belt of the overlying object. Thus, the major reactive forces brought into play by operation of the block under vacuum, are between the belt upper surface and the overlying object. In this way, the gross frictional drag between the block and the belt is minimized.

In my patented prior system the belt drive arrangement includes an induction drive motor driving a reduction gear, the output of which is transferred by a toothed belt to the conveyor belt-driving friction pulley. Accurate station-keeping is provided by way of a location encoder.

In the present invention, a synchronous motor can be used, which enables predetermined (i.e. 'direct') station keeping, for accurate stop-start positioning control of the system, without requiring the use of a location encoder, as previously used.

A pair of guide pulleys on opposite sides of the drive pulley provide a deep, variable draw of the conveyor belt about the drive pulley, by controlling the extent of belt wrap about the drive pulley.

The previously used variable guide pulley that had an adjustable loading spring, to promote consistent conveyor belt tension and drive-pulley contact pressure is no longer required.

The conveyor belt drive and tensioning unit, which operates on the return run of the conveyor belt, is preferably located intermediate the ends of the conveyor section, thus enabling the use of smaller conveyor end rolls, while locating the belt drive away from the conveyor loading area, into a less vulnerable and more accessible location.

In this arrangement, wherein the "usual" chain drive to one of the end rolls is not used, conveyor belt backlash is virtually eliminated, so that in the event of reversing the conveyor there is no lost motion, due to belt slack and/or gear back-lash.

This facilitates accurate "station-keeping" in relation to adjusting and maintaining the stopping and starting of the conveyor in step with the work stations. This can also utilize a location encoder, which is driven off the conveyor belt end pulley, or simply by operation of a synchronous driving motor or other precision drive when such is installed. In the present invention the drive motor is preferably a synchronous machine, thereby enabling precise, direct speed and rotation control, for belt station keeping.

In many instances the style of motor, its manufacturer, and the controller to be used is specified by the customer. As an example, in the case of ABB (Aktiegeselschaft Brown Boveri), that company would provide both motor and controller.

In a second embodiment of the present invention the transfer belt includes a pair of toothed (cogged) drive surfaces on the flanks of its inner face, akin to automotive timing belt structures, by which the conveyor is positively driven/reversed, through a toothed pulley.

The oncoming and off-going pulleys of the conveyor may be correspondingly toothed, so that the teeth of the belt do not impede the operation of the conveyor. The top surface of the vacuum blocks may be profiled with a relieved passage on each side of a central vacuum zone, to accommodate the tooth portions of the belt, the blocks having raised outer shoulder portions forming guides for the outer edge portions of the positive-drive belt.

The conveyor has supporting foot brackets, and side brackets that are attached to the sides of, and support the conveyor beam, such that the conveyor is supported on the foot brackets, which are secured to the floor, or a supporting framework.

Alternatively, the side brackets may be suspended from an overhead framework.

The conveyor drive assembly may be integrated with the support system.

An integrated conveyor system may consist of a central motor driving a number of conveyors by way of a transversely extending splined shaft, thus providing a flexible arrangement for the lateral repositioning of the respective conveyors anywhere along the length of the shaft.

In such an arrangement, each conveyor drive can be connected to the splined shaft through a clutch, which allows respective conveyors to be disengaged from the drive shaft when not needed.

The modular vacuum blocks can also be utilized as air cushion (blower) blocks, wherein, upon the sensing of an object above the block, the servo-valve admits air to the block at a predetermined pressure above atmospheric, to serve as a supporting air cushion for the sensed object. One example of this aspect of the modular block might be a conveyor system having a pair of spaced outer belts running on "vacuum" for the transfer of objects such as large steel sheets, wherein the system includes a number of modular "blower" blocks located intermediately of the two outer belts, being equipped with the air sensor, and being supplied with air under pressure, in the presence of a sensed load, and serving as air-cushion blocks, over which the load rides.

The upper surface of these blocks would be substantially level with the top surface of the two outer belts, such that, upon the approach of a transported sheet, the outer suction blocks associated with the two conveyor belts would be actuated to apply suction to the overlying sheet portions, to hold it to the conveyor belts. Meanwhile, the intermediate blower blocks would serve as support slippers, over which the transported sheet would ride upon the individual air cushions of the respective blower blocks.

Owing to the individual sensing jets of both the suction and the blower block modules, air consumption is minimized, as air pressure is applied to each of the multi-stage vacuum-creating ejectors and to each blower block only when the presence of the transported sheet is sensed immediately over the respective block.

On passage of the transported sheet or other article beyond any one of the respective blocks, the respective high pressure blower or ejector air supply is terminated. Thus, highly efficient utilization of air is achieved.

As mentioned above, if a sheet requires to be transferred laterally, on or off a conveyor belt at a selected work station, the presence of a pressurized blower block or blocks beneath the sheet, or its intended position, greatly facilitate such transfer

BRIEF DESCRIPTION OF THE DRAWINGS

Certain embodiments of the invention are described by way of illustration, without limitation thereto other than as set forth in the accompanying claims, reference being made to the accompanying drawings, wherein:

FIG. 1 is a side elevation of the static elements of a belt conveyor in accordance with the present invention, the belt run path being represented by a chain-dotted line;

FIG. 2 is a perspective view of a subject first conveyor block module, and a portion of a perforated conveyor belt adjacent thereto, for a first embodiment of the present invention;

FIG. 3 is a plan view of the conveyor block module of the FIG. 2 embodiment;

FIG. 4 is a transverse section of the block module, taken at 4—4 of FIG. 3;

FIG. 6 is a side view of a conveyor support pedestal and belt drive assembly of the FIG. 5 embodiment;

FIG. 6A is a side view of the conveyor belt drive assembly of a second, toothed belt embodiment;

FIG. 8A is a view similar to FIG. 8, of an embodiment having the beam section of FIG. 7A, and a modified sensor air supply, without a regulator valve;

FIG. 9 is a plan view of a portion of a toothed conveyor belt embodiment;

FIG. 10 is a perspective view of a portion of a toothed conveyor belt embodiment; and, FIG. 11 is a perspective view of the FIG. 10 embodiment in an inverted condition.

DETAILED DESCRIPTION OF THE INVENTION

Figure 7:
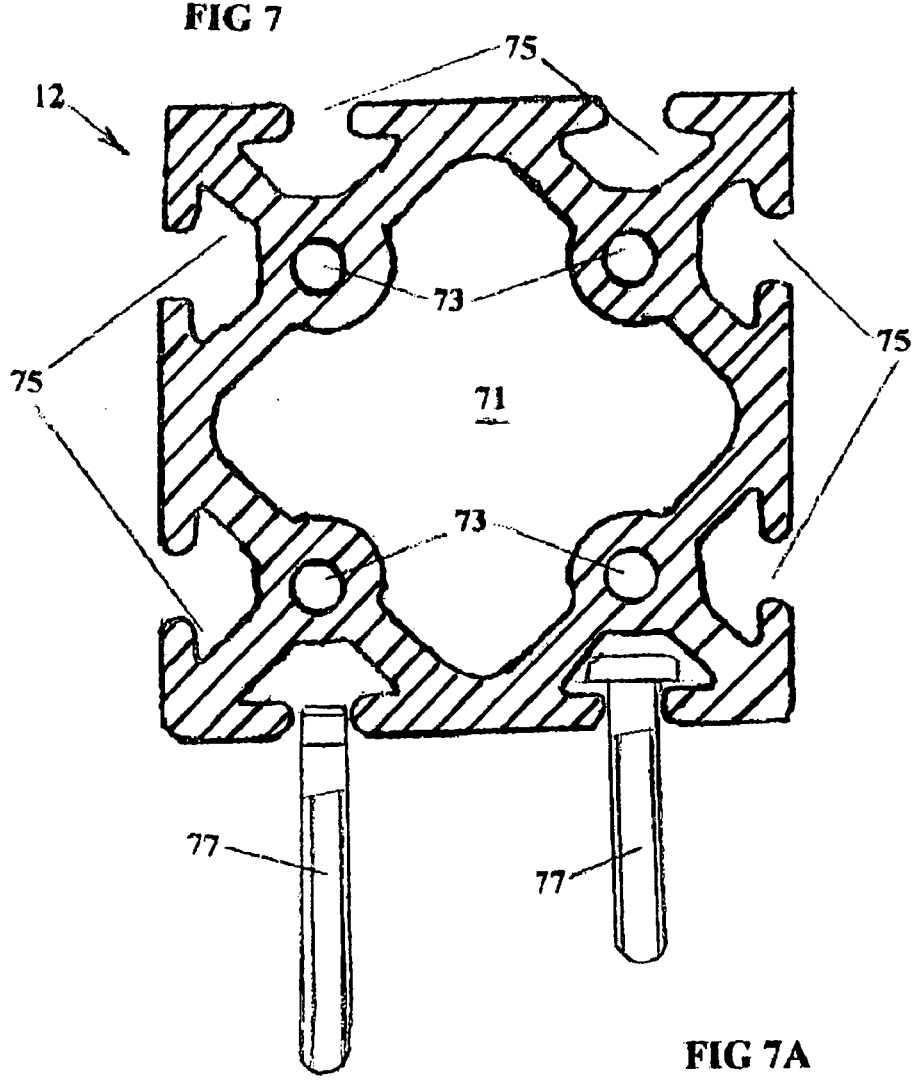
FIG. 7 is an end section of a first embodiment beam portion of a conveyor.
Figure 7A:
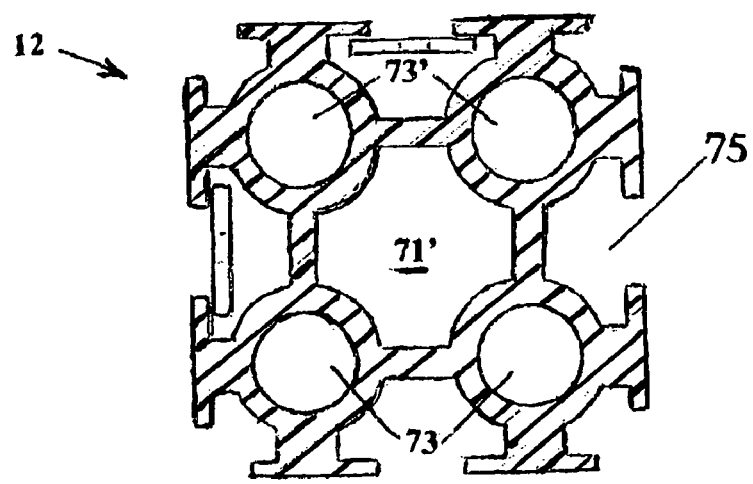
FIG. 7A is an end section of a second embodiment beam portion of a conveyor.

Referring to FIG. 1, the conveyor, 10 has an extended beam 12 of extruded aluminum section, a first embodiment being typically an 80×80 m.m section (see FIGS. 7 & 8) that runs the length of the conveyor 10. A second embodiment of a beam section is shown in FIG. 7A (to a smaller scale), having four significantly larger galleries.

Figure 5:
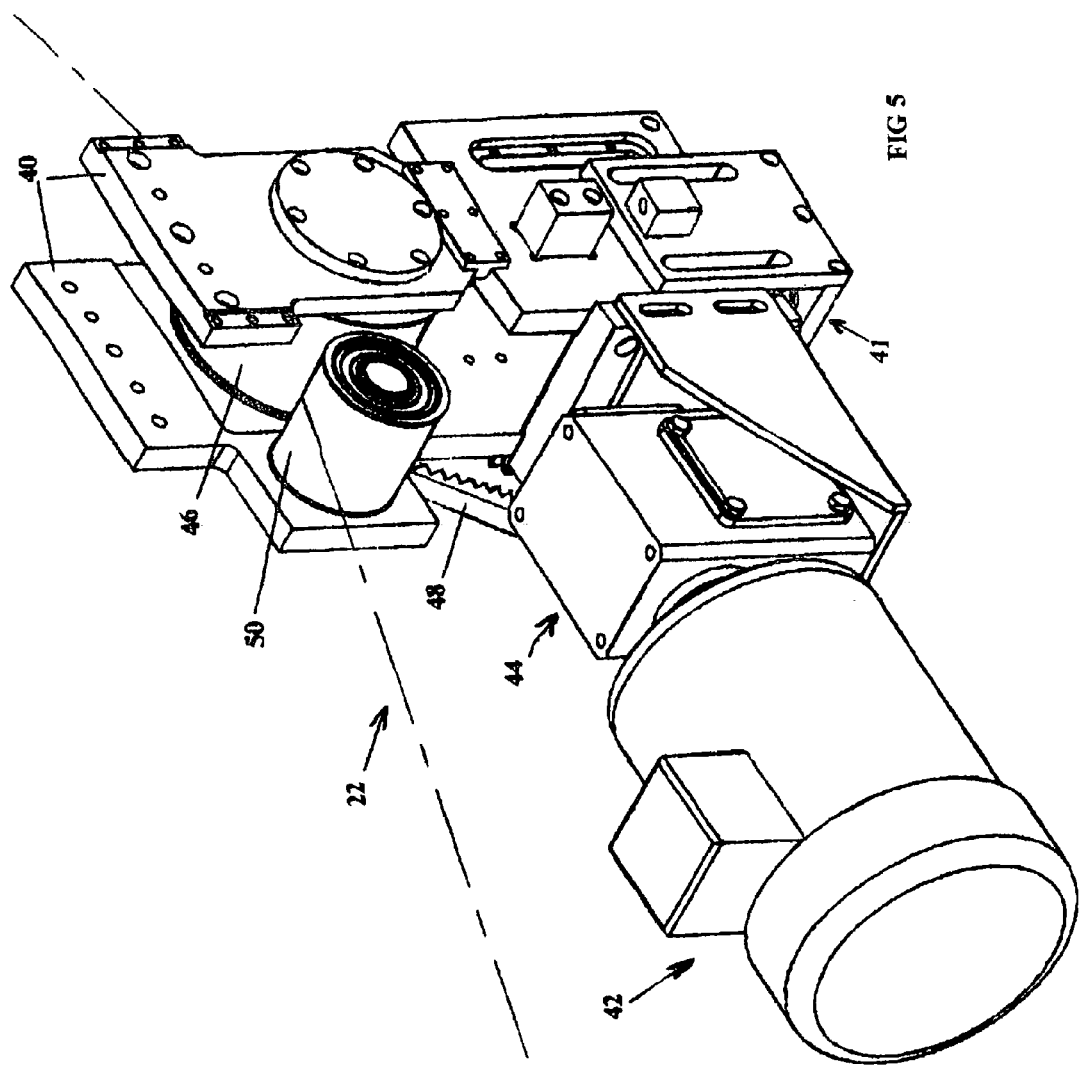
FIG. 5 is a perspective view of a first embodiment conveyor belt drive assembly.
Figure 6B:
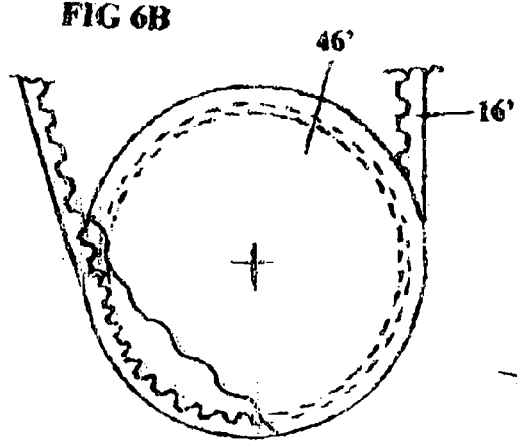
FIG. 6B is a detail of FIG. 6A.

An on-going end roll 14 and an off-going end roll 14' are mounted at the ends of the beam 12, about which rolls 14, 14' an endless perforated conveyor belt 16 is trained (see FIGS. 5 and 6).

A location encoder 15 is driven by one of the end rolls, shown as being the ongoing roll. A series of vacuum blocks 20 extend the length of the conveyor 10, being mounted upon the beam 12.

A belt drive 22 is located beneath the beam 12, in supporting relation therewith, being positioned in the mid-section of the conveyor 10, in spaced relation from the end rolls. The belt 16 is entrained with the belt drive 22.

The other end of the conveyor 12 is supported (see FIGS. 1 and 6C) by a primary belt tension adjuster 24', which has a single side bracket 25 supporting the conveyor 12, securing it by a foot bracket 27 attached to the floor or frame-works.

The roll 29 of adjuster 24'is rotatably mounted in canti-levered relation from a pivotal arm 33, carried on the side bracket 25, leaving the roll 29 fully accessible at its free end, to facilitate removal and replacement of the belt 16. The intermediate (bottom roller) is similarly cantilevered, being rotatably mounted coaxially with the pivot axis of arm 33.

An adjustable turn-buckle 31, acting upon the pivotal arm 33, serves to provide primary tension to the belt 16, by way of adjusting the length of the turn-buckle 31, so as to reposition the roll 29.

Referring to FIGS. 2, 3, and 4, the vacuum block 20 is of shallow construction, having a pair of shoulders 23, 23' that border a wide, shallow passage 24 extending the length of the block 20, along which the belt 16 passes.

A series of shallow grooves 26 (illustrated as being two in number) extend almost the full length of the block 20, the ends of which grooves terminate adjacent the ends of the block 20.

The grooves 26 are laterally spaced within the passage 24 in precise coincidence with the apertures 26' of the belt 16, on passage of the belt 16, moving longitudinally thereover. The belt 16 serves to seal-off the grooves 26, such that the transfer of air (or vacuum) is directly between the grooves 26 and the apertures 26', while the belt serves to seal off both lateral and longitudinal air leakage.

Figure 4A:
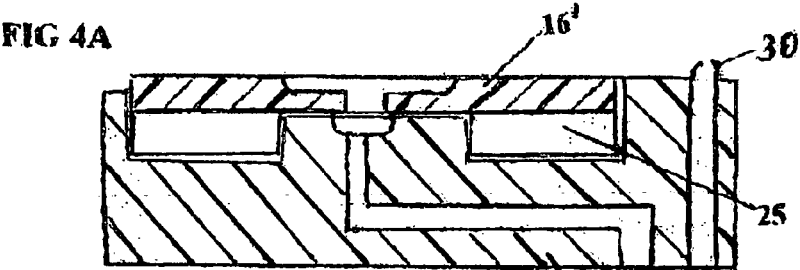
FIG. 4A is a section view similar to FIG. 4 (to a different scale), showing a toothed belt embodiment in mounted relation upon a related block module.

In the case of the FIG. 4A toothed (cogged) belt embodi-ment, the vacuum blocks 20' have two axial recesses flank-ing a central land. The recesses accommodate the down-wardly depending toothed portions of the belt, being laterally bounded by shoulder portions of the block that serve as guides for the belt edges.

A low-pressure sensing jet 30 is located adjacent one edge of the vacuum block 20'. The blocks 20, 20' have a through hole 28 at each end, for securing T-bolt screws 30' that engage the top surface of beam 12 (see FIG. 7A).

Reverting to FIGS. 2 and 3, a vertical jet aperture 30, located on the active side of the transfer block 20, extends through the thickness of the block 20, for the passage of a low-pressure, article-sensing air jet, directed upwardly along the "active edge" of the belt 16, where loading of articles takes place.

A transverse air passage 32 at the mid point of the block 20 connects by way of apertures 34 with the grooves 26 for the transfer of air therethrough, in either direction, depend-ing on the role served by the block 20, for the application of vacuum or positive air pressure. Turning to FIG. 5, the belt drive 22 has a pair of bracket plates 40 for attachment to the sides of the beam 12, by which the beam 12 is supported, and mounted upon base flange 41.

A synchronous electric motor 42, or other selected prime mover, driving through reduction gearbox 44, drives the belt drive pulley 46, 46' by way of a toothed belt 48. A conveyor belt guide pulley 50 is located at the oncoming side of the belt drive pulley 46, 46', with an adjustable, spring loaded pulley 47 (see FIGS. 6 and 6A) at the offgoing side of pulley 46, 46', providing a deep draw to the belt 16, 16', about the driving pulley 46, 46'. A compression spring 49 loads the guide pulley 47 towards the drive pulley 46, to control the contact pressure of the respective belts 16, 16' against the respective drive pulley 46, 46'.

The vertical locator of the pulley 47 is spring loaded such that the tension of the belt 16, 16' is accomodated, together with the extent of the wrap of belt 16, 16' about the respective pulley 46, 46'.

Figure 5A:
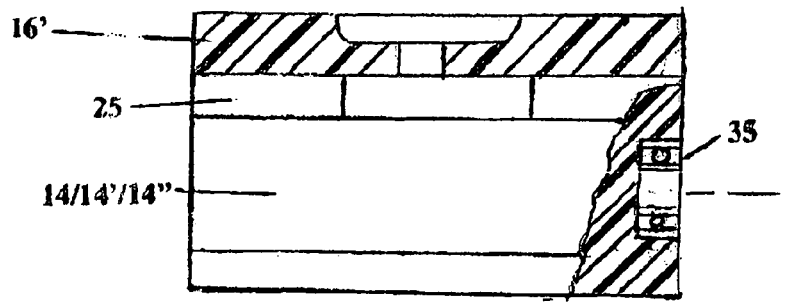
FIG. 5A is an end section of a toothed belt embodiment upon a cogged end pulley.

FIG. 5A shows a direct drive, toothed belt 16' in relation to an ongoing (or off-going) roller 14, having a toothed (splined, or cogged) profile to accept the tooth portions 25 located on the outboard portions of the belt 16'.

All idler rollers, including the end rollers 14, 14', 14" are of plastic, and have bearings 35 in pressed relation therein, providing for low cost, rapid roller replacement.

In the case of the FIG. 6 embodiment, the pressure of the belt 16 against the rubber covered roll 46 can be accurately controlled.

Figure 6C:
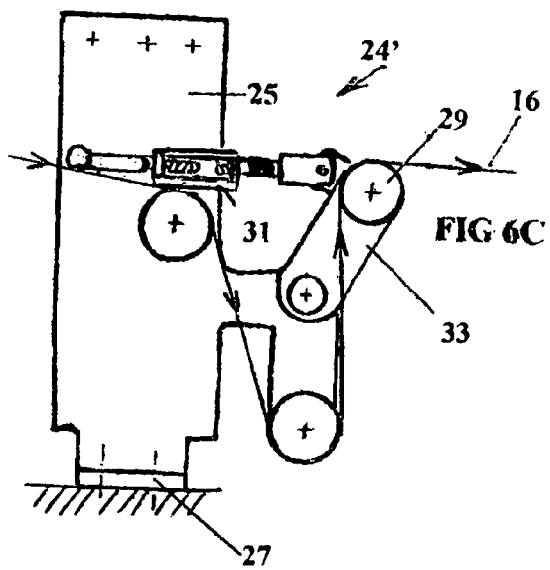
FIG. 6C is a side view of the rear support pedestal and the primary belt tensioner.

FIG. 6C shows in greater detail the turn-buckle 31 of the belt primary tension adjuster 24'. The pivot arm 33 is concentrically mounted with the axis of rotation of the lower guide roll.

Figure 8:
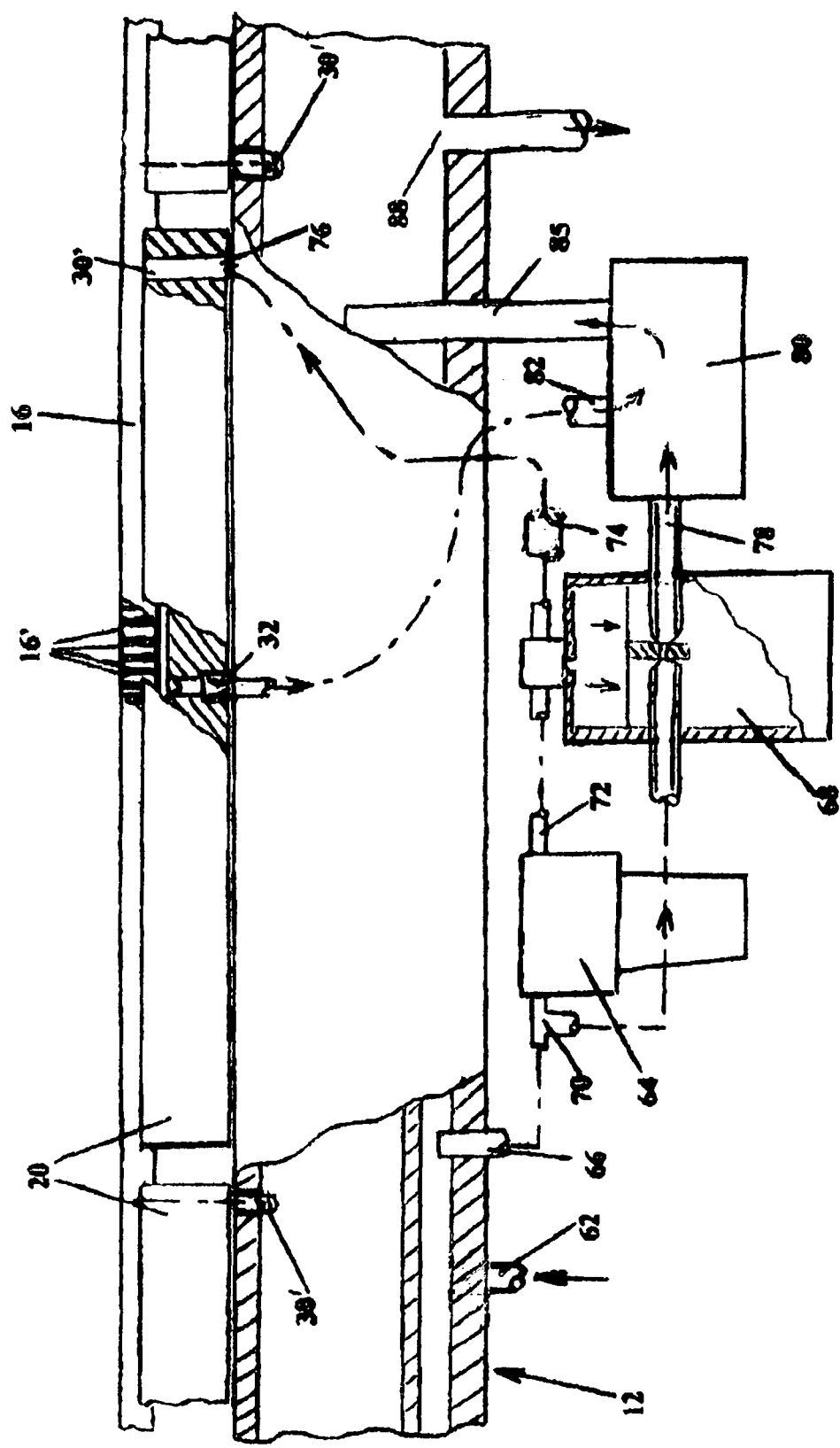
FIG. 8 is a schematic side, elevational view of a portion of a conveyor, with the associated air transfer equipment of the module.

Referring to FIG. 8, a portion of conveyor belt 16 is shown passing over a series of vacuum blocks 20, the blocks 20 being mounted upon a support beam 12. The beam 12 may be of extruded aluminum, having a cross-section as shown in FIG. 7, with a large, centrally located main chamber 71 and bordering small bore service galleries 73.

The square profile has two recesses 75 along each face, for the insertion of T-bolts 77, for attachment purposes, one of which is shown partially inserted, prior to its rotation to engage the bolt head with the adjacent recess shoulders. An alternative mode of making such attachment is the use of threaded nut plates 77' (shown in FIG. 7A).

One or more service galleries 73 may receive and supply service air, as by way of inlet 62, at about 80 psi. Another service gallery may supply air at 10 psi for sensor operation, another being placed under vacuum, to provide vacuum service, while the main chamber 71 is used as an atmospheric vent in the subject application.

Two of the galleries 73 are shown having drilled and tapped (threaded) access for connector nipples 62', one being shown, by means of which connection is made to the respective galleries. Two-piece threaded couplers with elastomeric sealing washers are preferably used, enabling rapid connection and disconnection by hand. One such coupler is shown in FIG. 8A, providing connection of ejector 80 with connector 85.

Air at supply pressure is applied to a pressure regulator 64 by way of connector 66, from gallery 73, and supplied to a back-pressure sensing valve 68, by way of connector 70.

A pressure regulator 64, used with the FIG. 7 embodiment, has outlet 72, supplying air at reduced pressure to a connector 74, which connects to the inlet 76 of transfer block 20, to supply the vertical jet aperture 30' (FIG. 2) with low pressure air at 10 psi as an object sensing jet.

The FIG. 7A embodiment does not require the use of a pressure regulator, owing to the evident greater capacity of the large bore high and low pressure air and the vacuum galleries, which serves to stabilize the low pressure air and vacuum supply, respectively.

This FIG. 7A embodiment has a single recess 75 along each face, to contain nut-bars 77', which are threaded to receive bolts or studs in attached relation therewith.

Reverting to FIG. 8, the outlet 72 also connects with the back-pressure sensing valve 68, supplying low pressure air to it. Operation of the valve 68, by creation of back-pressure at the nozzle 30', serves to admit supply air at high pressure by way of supply outlet 78 to the multi-stage vacuum-creating ejector 80. Operation of the ejector 80 applies high vacuum by way of outlet 82 to the air passage 32 of the related transfer block 20 (see FIGS. 2 and 3). This vacuum is transferred to the upper surface of the belt 16 (see above), to act upon any body that may be present there.

The exhaust air from the ejector 80 together with air drawn through the belt 16 and the block 20 passes by way of connector 85 to the main chamber 71 of the beam 12.

The chamber 71 of the beam 12 has an atmospheric exhaust drain 88, set low in the chamber, to vent air, together with any carry-over of liquid contaminants drawn down through the system, such as surface oils from off the underface of steel sheet being transferred by the system. In the case of an inverted system, the atmospheric exhaust drain inlet extends downwardly into close proximity to the floor of the chamber 71. When the system is operating, with the the belt 12 being driven by the motor, low pressure air is supplied to the object sensing jet aperture 30'. An approaching object, supported on the belt 12, and approaching the subject block 20 intercepts the low pressure jet from the sensor aperture 30' of that block 20, generating back pressure that is sensed by and operates upon the valve 68. This same action takes place when a sheet is placed upon the conveyor, and passes over the sensing jet from an aperture 30'.

Operation of the associated valve 68 admits air to the ejector 80 by way of connector 78. Operation of the ejector 80 applies suction to the vacuum outlet 82, and thence to the air passage 32 of the block 20. The vacuum is transferred through the belt apertures 16' to the upper surface of the belt 16, to those portions of the belt as it passes over the subject transfer block 20.

When the low pressure sensing jet is no longer affected, due to passage therepast of that portion of the belt 16 carrying the previously sensed object, the back-pressure in the valve 68 drops, thus interrupting the supply of high pressure air to the ejector 80, which ceases operation, thus ending the vacuum regime for that block 20. Activity would normally then transfer to the adjoining block 20, in the path of the belt 16, with a repeat of the sensing and vacuum-generation activity of the respective associated system.

Turning to the FIG. 7A beam embodiment, a larger section is employed, having a large, centrally located main chamber 71' and large bore bordering service galleries 73'.

The square beam profile has a recess along each face, for the insertion of T-bolts 77 or nut-bars 77'for attachment purposes, as referred to, above.

One or more service galleries 73' may receive and supply service air and/or vacuum, as in the case of the FIGS. 7 and 7A embodiments, while the main chamber 71' is used as an atmospheric vent in the subject alternative application.

I have found that the FIG. 7A beam extrusion embodiment constitutes a stiffer structure, while its large bore corner galleries provide greater reserve volume in relation to both high and low pressure air, such that in the FIG. 8A embodiment, which incorporates the FIG. 7A beam section, no low pressure regulators of the type present in the first embodiment sensor circuit are required.

In the case of the FIG. 8A embodiment, having the larger section service galleries 73' referred to above with regard to FIG. 7A, and the regulator 64 being dispensed with, air (at low pressure—about 10 psi) is supplied from one of the four service galleries 73' by way of connector 66 to the back pressure sensing valve 68.

Outlet 66 is connected to a low pressure air supply gallery 73', to provide sensor air to the low pressure side of the pressure sensing valve 68, and to the nozzle 30'of the associated vacuum block.

Operation of the improved system is similar to that of the system shown in FIG. 8.

Referring to FIGS. 9, 10 and 11, it will be seen that the belt 16 has a row of through apertures located on its main axis, which apertures extend through the thickness of the belt, each emerging at a shallow transverse suction slot in the upper face of the belt (see also FIG. 4A).

FIG. 11 shows the underface of the belt, with its two rows of cog-like teeth projecting from the inner face of the belt, having the through apertures located centrally therebetween.

What is claimed is:

1. A conveyor system having an endless belt travelling in a loop having an upper, working belt portion, and a lower, return belt portion; guide rolls adjacent the ends of said working and return belt portions; belt driving means located between said guide rolls having a toothed driving roll located within said loop receiving said belt in driving relation therewith, an oncoming guidance roll, an offgoing guidance roll, and guidance roll positioning means for positioning at least one said guidance roll in selective positioned relation with said belt and said driving roll, to substantially control the wrap and load transfer between said belt and said driving roll, wherein said driving roll includes at least one annulus of gear teeth in engaged driving relation with said belt, said belt having projecting tooth portions on the belt inner face in engaging relation with said gear teeth of said driving roll.

2. The conveyor system as set forth in claim 1, said upper working belt portion being located adjacent at least one work station, for transfer of articles therebetween; said belt driving means including motor means in driving relation with said rotatable toothed drive means; and motor control means for precisely rotating said motor to drive said belt in predetermined precise stopping relation with said work station, to enable accurate transfer of a said article.

3. The conveyor system as set forth in claim 1, said belt passing in guided relation over an end roll; said roll having a plastic body of substantially cylindrical form, with bearing means at each end of said roll, pressed within the roll end.

4. The conveyor system as set forth in claim 1, wherein said belt driving means includes a synchronous electric motor, to enable precise direct control of the location of said belt, relative to work stations located beside said belt.

5. The conveyor system as set forth in claim 1, said belt passing over vacuum blocks, said blocks being of high density plastic, and having a plurality of air passages in predetermined, patterned relation at a surface of the block; and a pair of raised shoulder portions in mutually spaced relation, flanking said patterned air passages.

6. The conveyor system as set forth in claim 1, said belt having a mid-section with through perforations, said projecting tooth portions on said belt inner face being located outboard of said belt mid section.

* * * * *